(12) United States Patent
Winkler et al.

(10) Patent No.: US 10,560,831 B2
(45) Date of Patent: Feb. 11, 2020

(54) PROVIDING ASSISTANCE IN AN EMERGENCY

(71) Applicant: Noonlight, Inc., St. Louis, MO (US)

(72) Inventors: William Zachary Winkler, St. Louis, MO (US); Christopher Chad Womack, San Diego, CA (US); Aaron Mikkael Kunnemann, St. Louis, MO (US)

(73) Assignee: Noonlight, Inc., St. Louis, MO (US)

( * ) Notice: Subject to any disclaimer, the term of this patent is extended or adjusted under 35 U.S.C. 154(b) by 0 days.

(21) Appl. No.: 16/396,530

(22) Filed: Apr. 26, 2019

(65) Prior Publication Data

US 2019/0253865 A1 Aug. 15, 2019

Related U.S. Application Data

(63) Continuation of application No. 15/164,624, filed on May 25, 2016, now Pat. No. 10,278,050.

(51) Int. Cl.

| | |
|---|---|
| *H04M 1/725* | (2006.01) |
| *H04W 4/02* | (2018.01) |
| *H04W 4/90* | (2018.01) |
| *H04M 3/51* | (2006.01) |
| *H04W 4/029* | (2018.01) |
| *H04W 12/08* | (2009.01) |
| *G08B 25/01* | (2006.01) |
| *H04M 3/42* | (2006.01) |
| *H04W 76/50* | (2018.01) |
| *H04L 29/06* | (2006.01) |

(Continued)

(52) U.S. Cl.
CPC ............ *H04W 4/90* (2018.02); *G08B 25/016* (2013.01); *H04M 1/72541* (2013.01); *H04M 3/42357* (2013.01); *H04M 3/5116* (2013.01); *H04W 4/02* (2013.01); *H04W 4/029* (2018.02); *H04W 12/08* (2013.01); *G08B 25/001* (2013.01); *G08B 27/001* (2013.01); *H04L 63/083* (2013.01); *H04L 63/168* (2013.01); *H04M 2242/15* (2013.01); *H04W 12/00508* (2019.01); *H04W 12/04* (2013.01); *H04W 76/50* (2018.02)

(58) Field of Classification Search
CPC ........... H04M 3/5116; H04M 1/72541; H04M 1/72577; H04W 12/04; H04W 4/02; H04W 4/22; H04W 76/007; H04W 12/08; H04L 63/083; H04L 63/168
See application file for complete search history.

(56) References Cited

U.S. PATENT DOCUMENTS

| | | | |
|---|---|---|---|
| 2013/0231077 A1* | 9/2013 | Cahill | G08B 25/008 455/404.2 |
| 2014/0351732 A1* | 11/2014 | Nasraoui | G06F 3/0488 715/771 |

(Continued)

*Primary Examiner* — Liton Miah
(74) *Attorney, Agent, or Firm* — Nwamu, P.C.

(57) ABSTRACT

A notification of an emergent condition. In one example, a mobile device application executing on the processor of a user device communicates with a server system over a telecommunications network, which generally comprises the public Internet. The mobile device user includes a "dead man's switch" control, which begins the emergency notification process if released. The emergency alert process uses a central case management server to provide a uniform interface into key data, reducing the need for operators to provide information verbally.

7 Claims, 7 Drawing Sheets

(51) Int. Cl.
*G08B 25/00* (2006.01)
*G08B 27/00* (2006.01)
*H04W 12/00* (2009.01)
*H04W 12/04* (2009.01)

(56) References Cited

U.S. PATENT DOCUMENTS

2016/0308858 A1* 10/2016 Nordstrom ............ H04L 63/068
2017/0011210 A1* 1/2017 Cheong ................ A61B 5/0022

* cited by examiner

FIG. 5

SendPolice  Enter Case ID  How it works

♣ Caller's Profile

Case ID: JQDI64
Name: Jake Smith
Caller's Number: (123) 456-7890
Caller's Safeword: 1111
Emergency Time: 2/1/15, 11:40:53 pm
Local Police:
Current Location:
- Lat: 38.969245
- Lon: -92.301295
- Accuracy Estimate: 5 meters
- Last Updated: 2/1/156, 11:43:25 pm

[Get Approximate Address] — 607

● SMS Chat With Caller — 609

3/1/16, 5:44:07 am  [Hello?]

3/1/16, 3:33:38 pm
We are sending police to your location.
3/17/16, 12:05:26 am

[Type your message here...]  [Send]

[MAP | Satellite]

PROVIDING ASSISTANCE IN AN EMERGENCY

CROSS REFERENCE TO RELATED APPLICATION(S)

This application is a Continuation of U.S. Utility patent application Ser. No. 15/164,624, filed May 25, 2016, which claims the benefit of U.S. Provisional Patent Application Ser. No. 62/179,977, filed May 26, 2015, and claims the benefit of U.S. Provisional Patent Application Ser. No. 62/179,978, filed May 26, 2015, and claims the benefit of U.S. Provisional Patent Application Ser. No. 62/179,976, filed May 26, 2015. The entire disclosures of all of these documents are herein incorporated by reference.

BACKGROUND

Almost every American child is now taught to call 9-1-1 in the event of an emergency. The 9-1-1-system found its origin in the 1950s, when emergency responders pushed for a nationwide standard emergency phone number, which resulted in the 9-1-1 system. Originally implemented through mechanical call switching, the 9-1-1 number is now used for most types of emergencies, including fire, police, medical, and ambulance.

The 9-1-1 system is implemented using dispatch centers known of public safety answering points ("PSAPs"), sometimes also known as public safety access points. A PSAP is essentially a call center that answers 9-1-1 calls and triages the emergency, directly dispatching appropriate first responders or contacting a dispatch office for the appropriate first responders.

For the PSAP call center to determine the proper first responder for the emergency, the PSAP operator typically must acquire some basic information from the caller. This information includes name, location, and a general description of the emergency. Thus, when a call is placed to 9-1-1, the PSAP operator generally asks the caller for that information. This is because the 9-1-1 system was designed during the landline era, and its technology is based on landline systems. Most modern PSAPs are capable of using call data to determine the origin of 9-1-1 calls placed over a landline.

However, more than 70% of 9-1-1 calls are now placed using mobile phones. Mobile phones can present certain advantages to the 9-1-1 system in that modern smart phones are capable of geolocation through use of a built-in global positioning system ("GPS") transceiver. However, not all mobile phones transmit location data in connection with a voice call, and not all PSAPs are equipped to receive and use location data. Thus, studies have shown that the chances of a 9-1-1 call center getting a quick and accurate location for the caller ranges widely across the United States, from 10% to 95%.

When a cell phone calls 9-1-1, the PSAP operator receiving the call generally transmits a digital request back to the cell phone asking for location data, but this data is not always sent. Even if it is, the data exchange can take several minutes, and sometimes does not work at all. Thus, although mobile phone applications have direct access to the GPS coordinates through the cell phone operating system, 9-1-1 PSAP operators attempt to get the location using a slow request/relay data exchange that does not work reliably.

Further, 9-1-1 calls from cell phones are not always routed correctly. Each PSAP has a geographic service zone, which often follows political borders such as county lines. Moreover, cell phone calls are usually routed to the nearest tower with the strongest signal. This tower may be in the geographic jurisdiction of a PSAP which does not cover the phone's cell location. Because the tower will route the call to the PSAP in the jurisdiction where the tower is located, calls from phones in a different PSAP jurisdiction can be routed to the wrong PSAP. This can result in further delay and confusion as the PSAP operator attempts to determine where the user is located, but the streets and addresses are not in the PSAP's local database.

Even when location data is available, placing the 9-1-1 is not always possible in the first instance. For example, in the common situation where a person is walking alone at night and confronted by a stranger, getting a phone out to place a 9-1-1 call may only escalate the situation, or result in a stolen or damaged phone.

Attempts to address these problems using mobile device applications with direct access to geolocation data, but these applications rely on timers and other triggering mechanisms that are impractical in an emergency situation. Such solutions generally trigger an alarm after some amount of time and require the user to frequently "check-in" by entering a personal identification number ("PIN") to cancel the alarm, but this again requires the user to get the phone out, potentially escalating a dangerous situation. Further, when the PIN is not entered, such applications generally just call 9-1-1, which does not solve the problem of inaccurate or missing location data or improper call routing.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a method for providing a notification of an emergency to a first responder comprising: providing a mobile device comprising a memory having thereon computer-readable instructions comprising an alarm application, the alarm application executing on a microprocessor of the mobile device; providing an alarm server communicably coupled to the mobile device over a telecommunications network; providing a case management server communicably coupled to the alarm server over the telecommunications network; providing a call center computer communicably coupled to the case management server over the telecommunications network; providing a public safety access point ("PSAP") computer communicably coupled to the case management server over the telecommunications network; displaying on a display of the mobile device an emergency alarm user interface comprising a touch-operable control; in response to a user of the mobile device touching the touch-operable control, the mobile device sending to the alarm server a data structure including: an indication of a user profile stored in a memory of the alarm server and having user profile data for the user, the user profile data including a phone number for the mobile device; an indication that the emergency alarm application is armed; and a geographic location of the mobile device; the mobile device transmitting to the alarm server at regular intervals an updated geographic location of the mobile device while the user continues to touch the touch-operable control; only when the user discontinues to touch the touch-operable control, the mobile device displaying on the display an interface for entering a password of the user; in response to the password not being entered correctly within a predetermined amount of time after the displaying step, the mobile device automatically transmitting to the alarm server an updated geographical location of the mobile device and an indication of an emergent condition for the user; in response to receiving the indication of an emergent condition, the alarm server transmitting to the case management server an alarm data record comprising the received updated geographical location and the user profile data retrieved from the alarm server memory; in response to receiving the alarm data record, the case management server: creating in a memory of the case management server a case data record comprising the received alarm data record and an associated case identification number generated by the case management server; sending to the phone number for the mobile device a text message indicating that an indication of an emergent condition for the user has been received and requesting confirmation of the emergent condition; transmitting to the call center computer a copy of the case data record; in response to receiving the case data record, the call center computer displaying to a call center operator the case identifier and the phone number in the received case data record, and a text message interface displaying in real-time any text messages received from the phone number; in response to the text message interface not being updated with a text message received from the phone number within a predetermined amount of time, the call center operator placing a voice call to the displayed phone number; in response to the placed voice call not being answered within a predetermined amount of time, the call center operator determining a PSAP for the emergent condition and placing a second voice call to a PSAP operator for the determined PSAP; the call center operator speaking the displayed case identifier to the PSAP operator on the second voice call; the PSAP operator retrieving from the case management server a copy of the case data record; the PSAP operator dispatching a first responder to assist the user at a location, the location being determined based on the geolocation data in the retrieved case data record.

In an example of the method, the mobile device is a mobile smart phone.

In another example of the method, the touch-operative control is a button.

In another example of the method, the user profile data comprises a unique identifier for user profile data record stored in a memory of the alarm server.

In another example of the method, geolocation is determined by a geolocation system transceiver of the mobile device.

In another example of the method, the geolocation system transceiver is for a global positioning satellite system.

In another example of the method, the PSAP operator retrieves the copy of the case data record by entering into a web site of the case management server the case identifier spoken on the second voice call.

In another example of the method, the mobile device is a smart watch.

In another example of the method: the password is a four-digit password; the displaying to the user an interface control for entering a password of the user comprises: displaying on a display of the smart watch a first plurality of digits, one digit in the plurality of digits being the first digit of the four-digit password; in response to the user tapping one digit in the displayed first plurality of digits, displaying on the display a second plurality of digits, one digit in the second plurality of digits being the second digit of the four-digit password; in response to the user tapping one digit in the displayed second plurality of digits, displaying on the display a third plurality of digits, one digit in the third plurality of digits being the third digit of the four-digit password; in response to the user tapping one digit in the displayed third plurality of digits, displaying on the display a fourth plurality of digits, one digit in the fourth plurality of digits being the fourth digit of the four-digit password; and in response to the user tapping one digit in the displayed fourth plurality of digits, displaying on the display an indication of whether the password is entered correctly; and the password is not entered correctly if any of the one digits tapped by the user does not match the corresponding digit in the four-digit password.

In a further example: the password is a four-digit password; the displaying to the user an interface control for entering a password of the user comprises: displaying on a display of the smart watch four different digits, including each of the unique digits in the four-digit password; in response to the user entering the four digits of the first-digital password in the correct order using the displayed digits, displaying on the display an indication of whether the password is entered correctly; and the password is not entered correctly if any of the one digits tapped by the user is not entered in the order the digit appears in the four-digit password.

Also described herein, among other things, is a method for providing a notification of an emergency to a first responder comprising: providing a case management server communicably coupled to an alarm server over a telecommunications network; providing a call center computer communicably coupled to the case management server over the telecommunications network; providing a public safety access point ("PSAP") computer at a PSAP communicably coupled to the case management server over the telecommunications network; receiving at the case management server from the alarm server a plurality of geographical coordinates and user profile data of a user, the user profile data comprising the user's name and phone number; creating in a memory of the case management server a case data record comprising the received plurality of geographical coordinates and user profile data and an associated case identification number generated by the case management server; transmitting to the call center computer a copy of the case data record; in response to receiving the case data record, the call center computer displaying to a call center operator the case identifier and the phone number in the received case data record; the call center operator placing a voice call to a PSAP operator at the PSAP; the call center operator speaking the displayed case identifier to the PSAP operator on the voice call; the PSAP operator retrieving from the case management server a copy of the case data record using the case identifier; the PSAP operator dispatching a first responder to a location indicated by the plurality of geographical coordinates.

In an example of the method, the geographical coordinates are determined by a geolocation system transceiver of a mobile user device.

In another example of the method, the geolocation system transceiver is for a global positioning satellite system.

In an example of the method, the PSAP operator retrieves the copy of the case data record by entering into a web site of the case management server the case identifier spoken on the voice call.

Also described herein, among other things, is a non-transitory machine-readable storage medium of a mobile user device having stored thereon machine-readable computer program instructions for an emergency alarm application, the program instructions causing the machine to perform the steps of: displaying on a display of the mobile user device a user interface comprising a touch-operable control; in response to a user touching the touch-operable control, sending to an alarm server over a telecommunications network a data structure including: an indication of a previously stored user profile data record for the user, the previously stored user profile data record including a phone number for the mobile user device; an indication that the emergency alarm application is armed; and a geographic location of the mobile user device; while the user continues to touch the touch-operable control, transmitting to the alarm server at regular intervals an updated geographic location of the mobile user device; only upon the user discontinuing to touch the touch-operable control, displaying on the display an interface for entering a password; in response to the password not being entered correctly within a predetermined amount of time, transmitting to the alarm server an updated geographic location of the mobile user device and an indication of an emergent condition for the user; receiving a text message requesting confirmation of an emergency; receiving a voice call requesting confirmation of an emergency; receiving an indication that a first responder has been dispatched to a location, the location being determined based on the updated geographic location of the mobile user device.

In an example, the mobile user device is a vehicular telematics system.

In another example, the mobile user device is a wearable computer.

In a further example: the password is a four-digit password; the displaying to the user an interface control for entering a password of the user comprises: displaying on a display of the smart watch a first plurality of digits, one digit in the plurality of digits being the first digit of the four-digit password; in response to the user tapping one digit in the displayed first plurality of digits, displaying on the display a second plurality of digits, one digit in the second plurality of digits being the second digit of the four-digit password; in response to the user tapping one digit in the displayed second plurality of digits, displaying on the display a third plurality of digits, one digit in the third plurality of digits being the third digit of the four-digit password; in response to the user tapping one digit in the displayed third plurality of digits, displaying on the display a fourth plurality of digits, one digit in the fourth plurality of digits being the fourth digit of the four-digit password; and in response to the user tapping one digit in the displayed fourth plurality of digits, displaying on the display an indication of whether the password is entered correctly; and the password is not entered correctly if any of the one digits tapped by the user does not match the corresponding digit in the four-digit password.

In a further example: the password is a four-digit password; the displaying to the user an interface control for entering a password of the user comprises: displaying on a display of the smart watch four different digits, including each of the unique digits in the four-digit password; in response to the user entering the four digits of the first-digital password in the correct order using the displayed digits, displaying on the display an indication of whether the password is entered correctly; and the password is not entered correctly if any of the one digits tapped by the user is not entered in the order the digit appears in the four-digit password.

BRIEF DESCRIPTION OF THE DRAWINGS

FIG. 5 provides an interface for a case management server according to the present disclosure.

FIGS. 6A and 6B provide a web interface for a PSAP operator to access a case management server according to the present disclosure.

DETAILED DESCRIPTION

Figure 1:
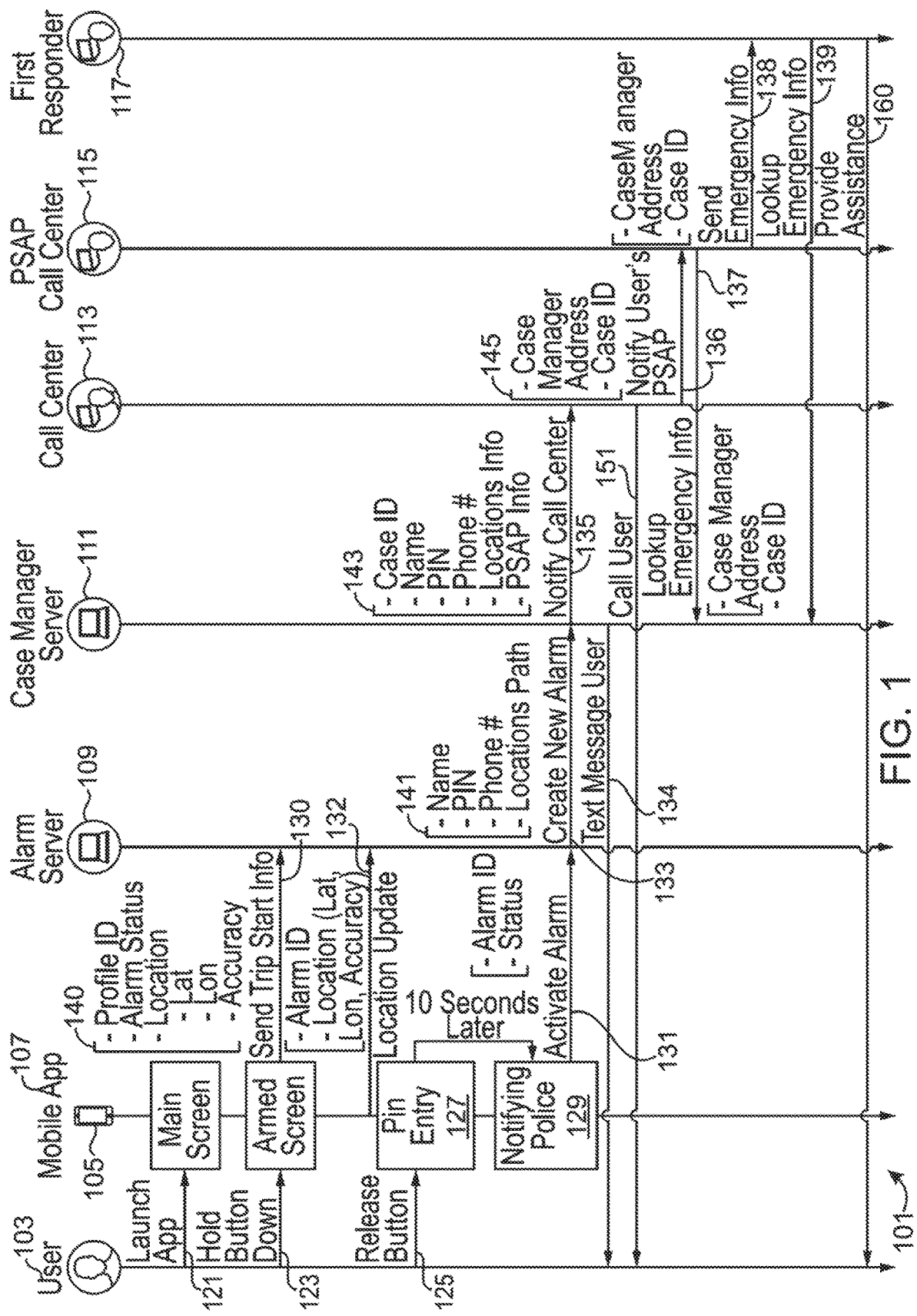
FIG. 1 provides a schematic diagram of an example of the systems and methods according to the present disclosure.

The following detailed description and disclosure illustrates by way of example and not by way of limitation. This description will clearly enable one skilled in the art to make and use the disclosed systems and methods, and describes several examples, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

Generally, described herein are computer-implemented systems and methods for implementing an emergency alert system using a mobile device carried by a user and communicating with a backend alarm server and call center system. At a high level, the systems and methods comprise a mobile device application executing on the processor of the user device, and communicating with the alarm server system over a telecommunications network, generally the public Internet. The mobile device application has a user interface implemented like a "dead man's switch," whereby so long as the user is operating a control of the interface, the user is considered "safe." If the user stops operating the control and fails to indicate a false alarm, a signal is sent over the network to the alarm server to activate the emergency alert system. The emergency alert system notifies a call center of the alarm, and the call center attempts to contact the user through a text message or voice call to confirm an emergency. If no response is received, the call center identifies and routes the emergency to the appropriate PSAP, which in turn identifies and routes the emergency to the appropriate first responder. These and other elements are described in further detail here.

Throughout this disclosure, the term "computer" describes hardware which generally implements functionality provided by digital computing technology, particularly computing functionality associated with microprocessors. The term "computer" is not intended to be limited to any specific type of computing device, but it is intended to be inclusive of all computational devices including, but not limited to: processing devices, microprocessors, personal computers, desktop computers, laptop computers, workstations, terminals, servers, clients, portable computers, handheld computers, cell phones, mobile phones, smart phones, tablet computers, server farms, hardware appliances, minicomputers, mainframe computers, video game consoles, handheld video game products, and wearable computing devices including but not limited to eyewear, wristwear, pendants, fabrics, and clip-on devices.

As used herein, a "computer" is necessarily an abstraction of the functionality provided by a single computer device outfitted with the hardware and accessories typical of computers in a particular role. By way of example and not limitation, the term "computer" in reference to a laptop computer would be understood by one of ordinary skill in the art to include the functionality provided by pointer-based input devices, such as a mouse or track pad, whereas the term "computer" used in reference to an enterprise-class server would be understood by one of ordinary skill in the art to include the functionality provided by redundant systems, such as RAID drives and dual power supplies.

The functionality of a single computer may be distributed across a number of individual machines. This distribution may be functional, as where specific machines perform specific tasks; or, balanced, as where each machine is capable of performing most or all functions of any other machine and is assigned tasks based on its available resources at a point in time. Thus, the term "computer" as used herein, can refer to a single, standalone, self-contained device or to a plurality of machines working together or independently, including without limitation: a network server farm, "cloud" computing system, software-as-a-service, or other distributed or collaborative computer networks.

Those of ordinary skill in the art also appreciate that some devices which are not conventionally thought of as "computers" nevertheless exhibit the characteristics of a "computer" in certain contexts. Where such a device is performing the functions of a "computer" as described herein, the term "computer" includes such devices to that extent. Devices of this type include but are not limited to: network hardware, print servers, file servers, NAS and SAN, load balancers, and any other hardware capable of interacting with the systems and methods described herein in the matter of a conventional "computer."

Throughout this disclosure, the term "software" refers to code objects, program logic, command structures, data structures and definitions, source code, executable and/or binary files, machine code, object code, compiled libraries, implementations, libraries, or any instruction or set of instructions capable of being executed by a computer processor, or capable of being converted into a form capable of being executed by a computer processor, including without limitation virtual processors, or by the use of run-time environments, virtual machines, and/or interpreters. Those of ordinary skill in the art recognize that software can be wired or embedded into hardware, including without limitation onto a microchip, and still be considered "software" within the meaning of this disclosure. For purposes of this disclosure, software includes without limitation: instructions stored or storable in RAM, ROM, flash memory BIOS, CMOS, mother and daughter board circuitry, hardware controllers, USB controllers or hosts, peripheral devices and controllers, video cards, audio controllers, network cards, Bluetooth® and other wireless communication devices, virtual memory, storage devices and associated controllers, firmware, and device drivers. The systems and methods described here are contemplated to use computers and computer software typically stored in a computer- or machine-readable storage medium or memory.

Throughout this disclosure, terms used herein to describe or reference media holding software, including without limitation terms such as "media," "storage media," and "memory," may include or exclude transitory media such as signals and carrier waves.

Throughout this disclosure, the term "network" generally refers to a voice, data, or other telecommunications network over which computers communicate with each other. The term "server" generally refers to a computer providing a service over a network, and a "client" generally refers to a computer accessing or using a service provided by a server over a network. Those having ordinary skill in the art will appreciate that the terms "server" and "client" may refer to hardware, software, and/or a combination of hardware and software, depending on context. Those having ordinary skill in the art will further appreciate that the terms "server" and "client" may refer to endpoints of a network communication or network connection, including but not necessarily limited to a network socket connection. Those having ordinary skill in the art will further appreciate that a "server" may comprise a plurality of software and/or hardware servers delivering a service or set of services. Those having ordinary skill in the art will further appreciate that the term "host" may, in noun form, refer to an endpoint of a network communication or network (e.g., "a remote host"), or may, in verb form, refer to a server providing a service over a network ("hosts a website"), or an access point for a service over a network.

FIG. 1 depicts a schematic diagram of a system and method (101) according to the present disclosure, and the flow of data among the various component systems and devices. The systems and methods generally comprise a user (103) carrying a mobile user device (105), depicted in FIG. 1 as a smart phone (105). The user device (105) comprises a memory and microprocessor, and a software application (107) stored on the memory is executed on the microprocessor. Although a smart phone is depicted, any mobile computer may be used, including, without limitation, wearable computers such as smart watches, and computers integrated into other mobile technologies, such as vehicular navigation and telematics systems.

Figure 3A:
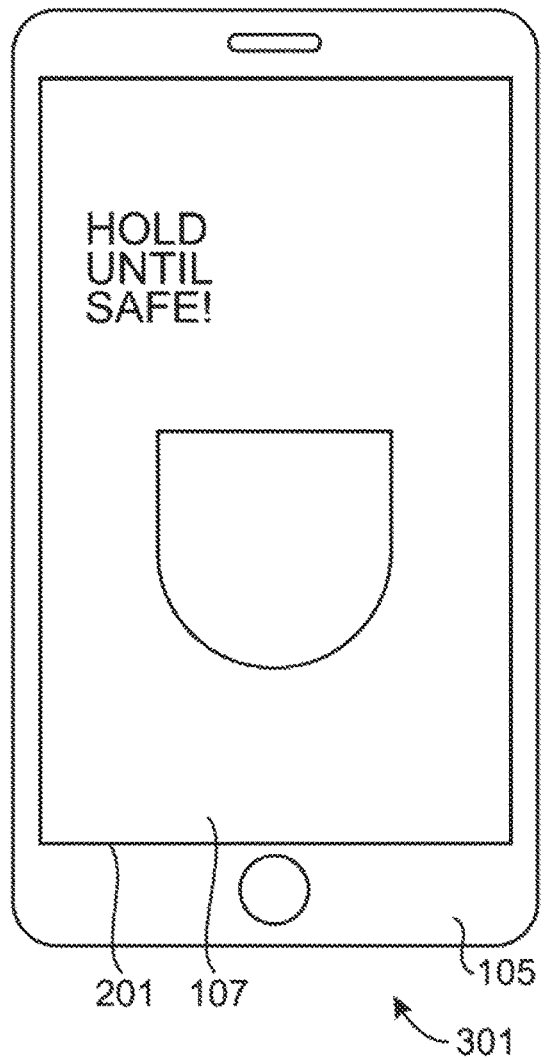
Figure 3B:
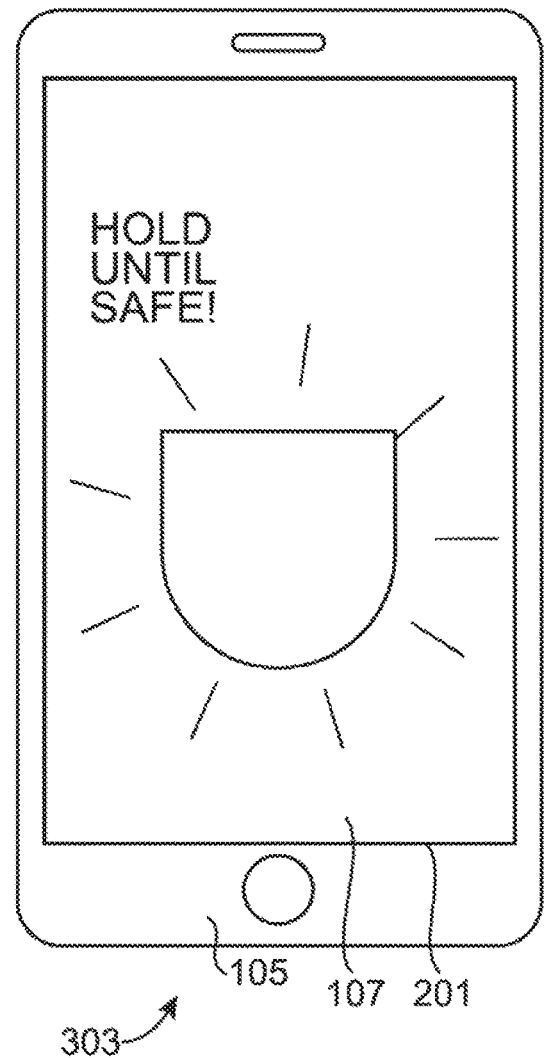
Figure 4:
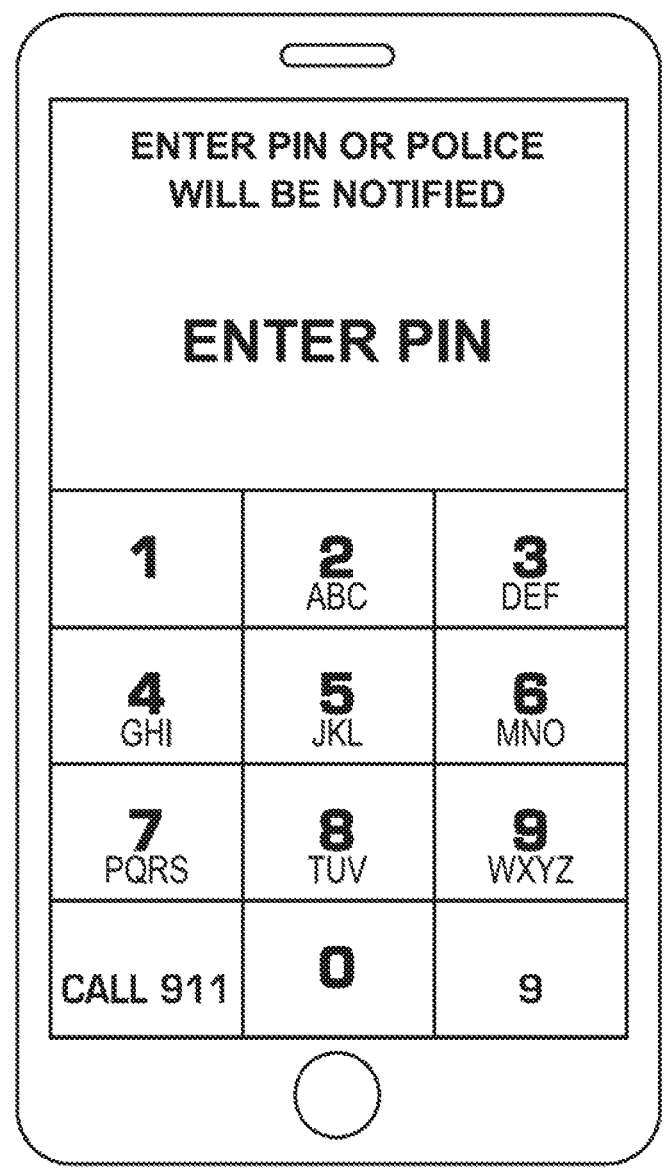

FIGS. 2-4 depict examples of the mobile device application (107). In the depicted examples, the application (107) presents a graphical user interface (201) ("GUI"), which includes a "dead man's switch" component (303). This component (303) is a GUI control (303) that, when continually or frequently operated by the user (103), indicates to the application (107) that the user (103) is not yet in danger or in an emergency situation. By way of example only, and without limitation, the primary use case for the application (107) is a user (103) traveling alone or in a small group through a potentially dangerous area, or during a potentially dangerous time, such as walking home alone at night, or walking out to the user's (103) car in an empty parking garage after working late.

Figure 2A:
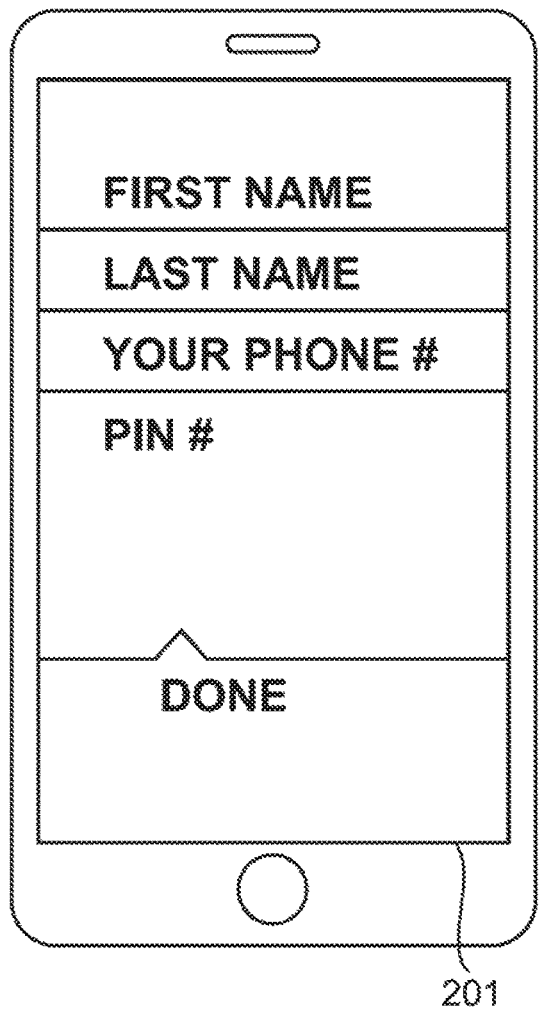
FIGS. 2A, 2B, 3A and 3B, and 4 provide user interface screens from a user device implementing an emergency alert application according to the present disclosure.
Figure 2B:
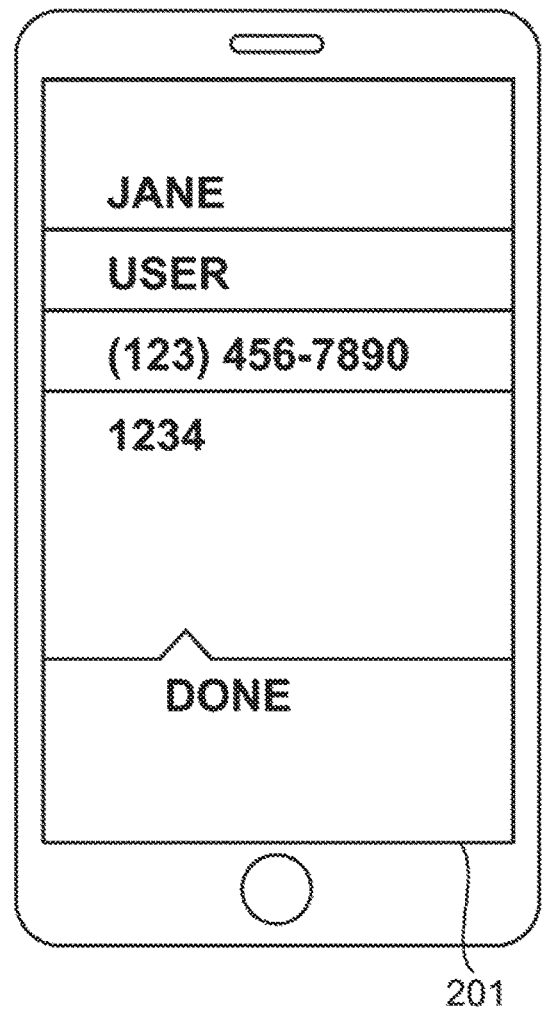

The user (103) generally begins using the system by downloading the application (107) to the user device (105) from a distribution platform, such as an application store now common for most mobile device platforms. The user (103) then sets up a user account using techniques known in the art. The minimal information required for an account is typically the user's (103) first and last name, phone number, and PIN. The user (103) also configures the application (107) with a PIN. This PIN is used to indicate an "all clear" signal, as described elsewhere herein. This information is referred to herein as "user profile data" or "user profile information." FIGS. 2A and 2B depict an example of a user profile setup screen requesting user profile information. The setup process generally need only be carried out once, before the application (107) is ready for use though the user (103) may return to this process to change or supplement the information. The user profile data may be stored locally on the user device (105) memory, or on remote servers (109) and/or (111), or both.

In an alternative example, the user (103) may provide further user profile information, such as the user's (103) date of birth, address, age, sex/gender, as well as information that may be useful to emergency responders attempting to locate or assist the user (103), such as a physical description of the user (103) and/or information about medical conditions the user (103) may have. By way of example and not limitation, such user (103) information may include: height; weight; build; ethnicity; eye color; hair color; hair length; hair style; skin tone; and/or unique or distinguishing markings such as tattoos, piercings, and birthmarks. Relevant medical information may include any information which may be useful to emergency responders or treating physicians if the user (103) is found unresponsive, such as, but not necessarily limited to, blood type, any current diagnoses (e.g., hypertension, diabetes), and any currently taken medications and their dosages. This extended information is also "user profile data" in an example.

In the depicted examples, the user (103) begins use by launching (121) the application (107) on the user device (105), which causes the main screen (301) to appear on the display of the user device (105). The main screen (301) comprises the main control (303). When the control (303) is operated by the user (103), the application (107) enters "armed" mode. In the depicted example, the control (107) is a simple, large button. The user (103) operates the control (303) by pressing and holding the button (303), placing the application (107) into "armed" mode. The user (103) continues to operate the control (107) by continuing to hold the button (107). While the user (103) holds the button (107), the application (107) remains in "armed" mode, and a visual indication may be provided that the application (107) is in armed mode. By way of example and not limitation, the button (303) may change colors and/or display an animation and/or text. To improve usability and reduce unintended slippage, in the depicted example of FIGS. 3A and 3B, a single, large touch-sensitive interface control (303) is the only interactive user interface control while the application (107) is armed.

When the user (103) initially operates the control (303), a "trip" (140) is begun. A "trip" refers mainly to data collected and stored related to a journey taken by the user (103) in the real world. The application (107) transmits (130) to an alarm server (109) over a telecommunications network an indication that a user (103) of the application (107) has begun a trip (140). This indication may include or indicate an identification of the user (103), such as by transmitting a unique user identification ("ID") or profile ID for the user (103), and may also provide the user's (103) current geolocation (e.g., latitude and longitude coordinates as determined by the user device (105)). The trip (140) is then stored in a memory of the alarm server (109) as a current or "open" trip (140), meaning the trip (140) is still ongoing and has not yet concluded safely or otherwise.

With the application (107) in "armed" mode, the user (103) may then begin to travel. The primary use case for the systems and methods is a user (103) making a trip on foot. While the user (103) travels, the user (103) simply continues to operate the control (303) (e.g., continue to hold the button down), causing the application (107) to remain in "armed" mode. Because the depicted control (303) is large, the user (103) can do so with the user device (105) in a pocket.

As the user (103) travels, the user's (103) geolocation may be updated (132) at intervals. For example, the geolocation of the user device (105) may be transmitted (132) to the alarm server (109) every ten or fifteen seconds. To reduce battery usage and bandwidth, in an example, the geolocation is only transmitted (132) if it has materially changed from the immediately prior update. Geolocation coordinates received from GPS systems generally include an error or accuracy range, which may also be transmitted (132) to the alarm server (109) system. The alarm server (109) of the depicted example will generally update the trip data (140) with subsequently received location updates, keeping track of both the historical locations received, allowing the trip to be mapped, and the most recent location. This data is generally associated with the "trip" data (140) for the specific trip (140) in the alarm server (109) memory.

The user (103) will eventually discontinue operating the control (303). There are two primary use cases for this scenario: either (1) the user (103) has decided to discontinue using the application (107), generally because the user (103) has safely reached his or her destination; or (2) the user (103) has encountered an emergency situation and requires help. When the user (103) discontinues to operate the control (303), a disarm interface (401) is displayed on the mobile device (105) allowing the user (103) to enter the PIN previously established. An example of such an interface (401) is depicted in FIG. 4.

If the user (103) enters the correct PIN, the application (107) exits "armed" mode and the trip (140) is concluded. An indication is sent from the user device (105) to the alarm server (109) indicating that the trip (140) has concluded safely. This communication may further include the final geolocation coordinates of the trip, which the alarm server (109) may add to the trip data (140) previously stored. The application (107) then discontinues sending geolocation coordinate updates.

If the wrong PIN is entered, or no PIN is entered within a predetermined amount of time, the system then begins the process of alerting emergency responders (129). In the depicted example of FIG. 1, this process begins with the user device (105) communicating (131) with the alarm server (109) to indicate that the PIN was not entered or was incorrect. This communication (131) may include additional information, such as the user ID or profile ID. However, because the additional information needed to notify first responders is generally transmitted (130) when the trip (140) is begun, it need not be transmitted again during this stage.

The alarm server (109) receives the activate alarm (131) communication and forms in a memory of the alarm server (109) system a data structure (141) representing the alarm status related to this trip. This data structure (141) may comprise, without limitation, the user name, PIN, phone number, user profile data, and one or more geolocation coordinates for the user device (105) during the trip. This alarm data structure (141) may be associated with an alarm ID as well. The content of this alarm data structure (141) is generally referred to herein as "alarm data."

In the depicted example, the alarm server (109) transmits the alarm data to a case manager server (111). The case manager server (111) receives the alarm data and creates a case data structure (143) in a memory of the case manager server (111) containing the contents of the received alarm data. The case data structure (143) comprises the received alarm data and is associated with a unique identifier, referred to herein as a "case ID." The data in the case data structure (143) is generally referred to herein as "case data." As described in more detail elsewhere herein, the case ID is used to efficiently communicate critical information about the user (103) and the emergency to a PSAP (115) and/or first responder (117).

One common problem with 9-1-1 systems is the incidence of false alarms, and this problem has been growing steadily worse as more users carry mobile phones. In an example, the present systems and methods may reduce false alarms by providing a "check-in" feature. In such an example, the case manager server (111), after receiving (133) the alarm data including the phone number for the user device (105), may attempt to confirm the emergency with the user (103) before alerting first responders. In the depicted example, the case manager server (111) sends a text message (134) to the user (103) via the user device (105), seeking confirmation that there is a real emergency, not a false alarm. This transmission (134) is preferably automatic.

The case manager server (111) also transmits (135) to a call center (113) a data structure including the case data (143). The call center (113) is generally a private call center (113) staffed by employees who are trained to use computers implementing the systems and methods described herein. In the depicted example, when the call center (115) receives the case data (143), one or more human operators is notified via a computer interface on a call center computer. This interface may be a web site, desktop application, or any other interface appropriate to convey the information and perform the functions described herein.

Figure 5:
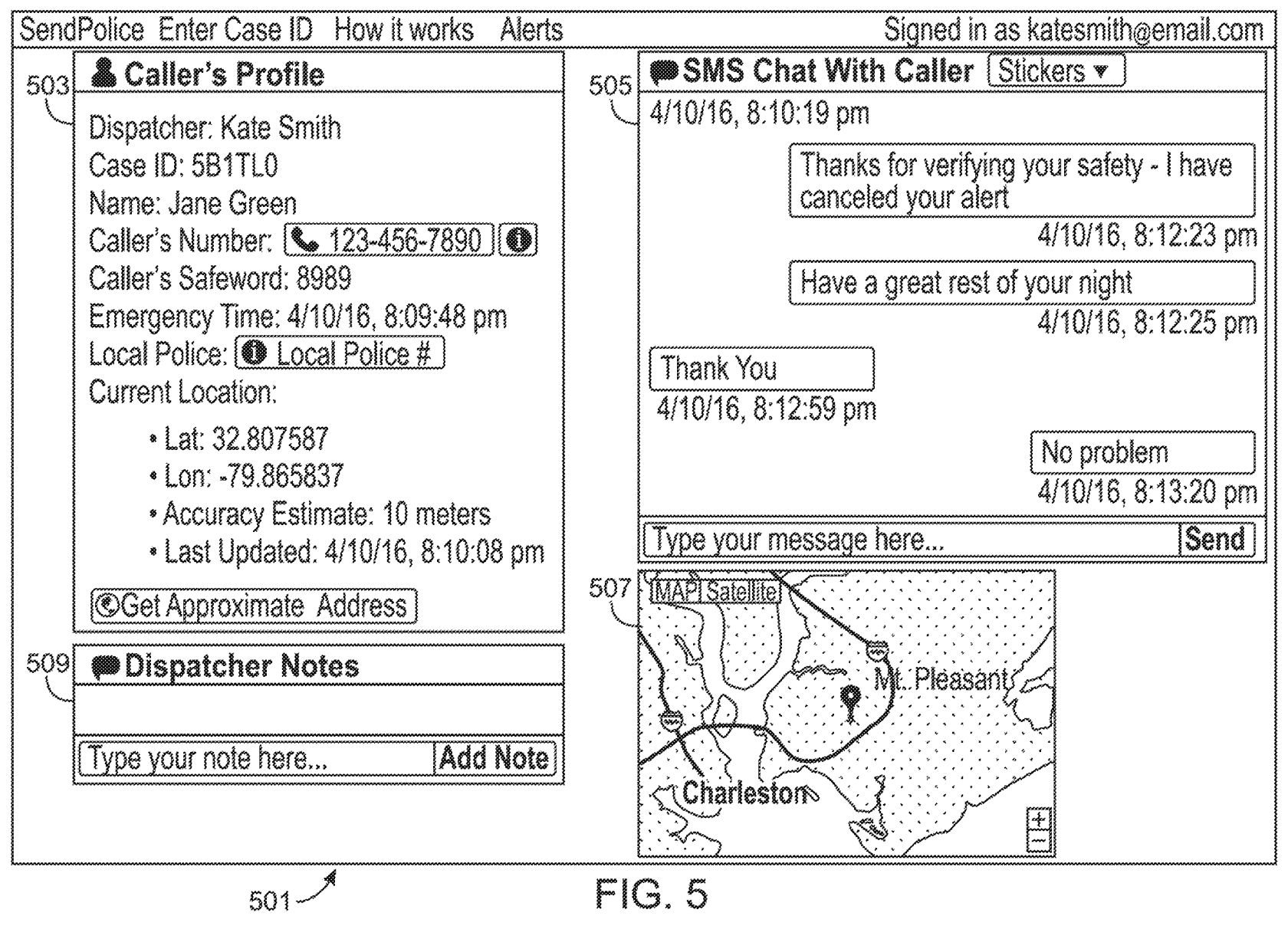

An example of such an interface is depicted in FIG. 5. In the depicted example, the interface (501) comprises a summary of the case data (503), and a display of the text message interaction (505) with the user (103). The text section (505) includes input components, allowing the operator to communicate with the user (103) via text messages using the text interface (505). The operator's messages are relayed to the user (103), and vice versa, via the case manager server (111).

The interface (501) may further comprise a map (507) or other visual indication (507) of the geolocation coordinates of the user device (105) received during the trip. The map (507) may further display the location history, showing a path taken by the user (103) during the trip based on the received geolocation coordinates of the user device (105). The interface (501) may further comprise other elements as well, including, without limitation, interface controls for the operator to make notes (509).

The automated initial confirmation text message is sent (134) at about the same time as the notification is provided (135) to the call center (113). This reduces end-to-end system response time by providing a text message to the user (103) early in the process, giving the user (103) time to enter a response while the alert process continues in the background. If the user (103) provides a response confirming safety, the case manager server (111) updates the interface (501) with the received text. The operator may then interact with the user (103) via the text interface (505). If the user (103) indicates via a text response that the alarm was a false alarm or the user (103) is otherwise safe, then the case is closed and no further action need be taken.

However, if the user (103) confirms danger or does not promptly respond, the system and methods proceed to escalate the alarm. In the depicted example, the operator at the call center (113) next attempts to place a voice call (151) to the user (103) via the phone number for the user device (105) included in the case data structure (143), which data is displayed to the operator via the caller profile (503) section of the computer interface (501). This voice call (151) would place the operator in direct voice communication with the user (103). If the user (103) answers and indicates that the alarm was a false alarm or the user (103) is otherwise safe, then the case is closed and no further action need be taken.

However, if the user (103) indicates danger or does not answer, the systems and methods proceed to escalate the alarm further. This escalation comprises determining the appropriate PSAP (115) to handle the emergency and the call center (113) contacting the appropriate PSAP (115) for the user (103). The method for determining the appropriate PSAP is described in further detail elsewhere herein. The call center (113) may contact (136) the PSAP (115) by voice communication technology, including, but not necessarily limited to, by using the 9-1-1 number, calling directly using a local access number (i.e., the 7- or 10-digit number for the call center), or voice-over-IP. Alternatively, the call center (113) may contact (136) the PSAP (115) via another technology, such as via a text or data connection only. Typically, voice communication is preferred, as PSAP (115) operators are trained to handle emergencies based upon voice information, and a voice call can be uniformly handled by PSAPs (115), even those that do not implement Phase II technologies.

In an emergency, a user (103) becomes anxious. Humans have adapted to promptly respond to fear and danger physiologically, and a user (103) who anticipates an imminent dangerous situation often experiences accelerated heartrate, rapid breathing, and a sudden release of hormones to prepare the body for "fight or flight." These physical symptoms can often make it difficult to think and speak clearly, and 9-1-1 callers sometimes have difficulty clearly explaining their location and circumstances. The present systems and methods address this problem via the call center (113), where an operator already has most of the relevant information about the emergency—the potential victim and his/her location—in the case data (143) and can calmly and clearly communicate this information over the voice call to a PSAP (115) operator.

However, even a calm person speaking over the telephone can be difficult to understand. This can be due to factors ranging from connection quality to phonetically similar names and letters, resulting in lost time and confusion as the call center (113) operator attempts to explain to the PSAP operator (115) the nature of the emergency and provide the case data (143) verbally. Often, time is lost as the call center (113) operator uses the phonetic alphabet to spell the names of the streets or the user, resulting in a slower overall response.

Figure 6A:
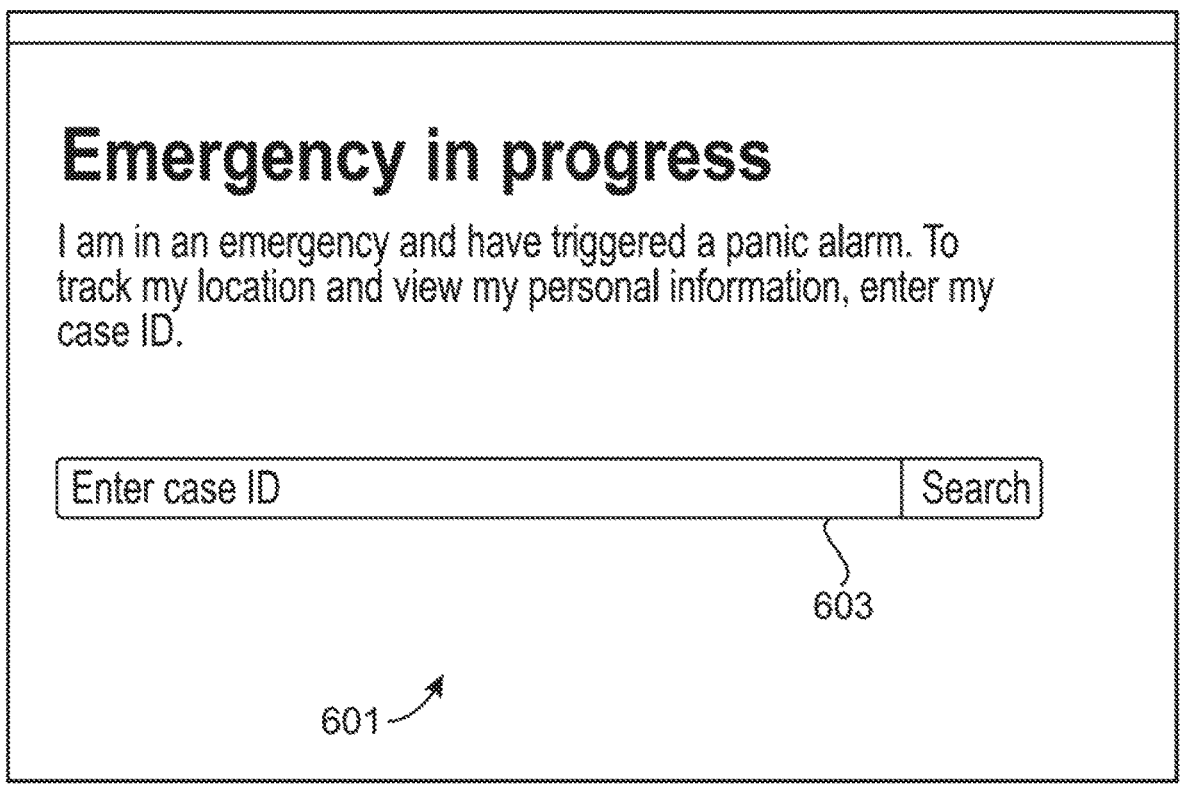

To address this, the present systems include a rapid-response interface accessible to both the PSAP (115) and first responder (117), which makes available the case data (143) in text format. In the depicted example, once the call center (113) operator has begun a voice call (136) with the PSAP (115) operator, the call center (111) operator instructs the PSAP (115) operator to connect (137) the PSAP (115) operator's computer to the case manager server system (111) via a web site having a rapid-response interface. The web site is preferably a very simple site with few interface components so that a PSAP (113) operator unfamiliar with the site can quickly understand the data it contains. The site also preferably has a short and simple domain name that is clearly, easily, and unambiguously communicated over the phone, such as SENDPOLICE.COM. An example of such an interface is depicted in FIGS. 6A and 6B.

The PSAP (115) operator loads the rapid-response interface in a browser, and the call center (113) operator verbally provides to the PSAP (115) operator the case ID associated with the case data (143). The PSAP (115) operator enters the case ID into an interface component (603) of the rapid-response interface. The case ID is then used to retrieve from the case manager server (111) the case data structure (143). The case data in the structure (143) is then used to populate the rapid-response interface (605) components, providing a visual indication to the PSAP (115) operator of the case data. The interface may further provide a map (607) of the location data, allowing the PSAP (115) operator to rapidly pinpoint the location. Because the case data includes the user's (103) name, phone number, and location data, time is not wasted verbally communicating information that is more efficiently communicate textually or visually.

The depicted example (605) comprises the same general layout as the case management interface (501) available to the call center (113) operator. This further improves response time by allowing both operators (113) and (115) to see the same information. The depicted example (605) generally comprises the same functions as well, including a navigable mapping component (607) and a text message history (609) updated in real-time. The interface (605) may also allow the PSAP (115) operator to directly send text messages to the user (103) via the interface (609), facilitating hand-off of the emergency from the call center (113) operator to the PSAP (115).

At this point, the emergency has generally been handed off to the PSAP (113) operator and is handled according to the standards and protocols established for the 9-1-1 system, though the call center (113) operator may continue to monitor the situation and provide further assistance as needed. Typically, under 9-1-1 operating procedure, the PSAP (115) contacts (138) the first responder (117), usually via a voice call to the first responder (117) dispatcher, and verbally provides the first responder (117) with the information needed to dispatch appropriate personnel to handle the emergency. The PSAP (115) operator may also use the case manager system (111) to communicate the information clearly and effectively, by providing the case ID to the first responder (117), who can then look the case up on the rapid-response interface (601) in the same manner as the PSAP (115). Once the first responder (117) has the information needed to handle the emergency, whether provided verbally by the PSAP (115) operator over the voice call, or acquired via the rapid-response interface, the first responder then provides assistance (160) to the user according to normal emergency management procedure.

Determining the appropriate PSAP (115) for the emergency may use one or more of a number of techniques, including techniques known in the art. The goal in determining the appropriate PSAP (115) is to identify the dispatch center that has within its geographic territory the current location of the user device (105). This improves the likelihood that the PSAP (115) is the correct dispatcher for first responders (117) familiar with the area. Because the geolocation of the user device (105) is known, the call center (113) operator can look up the coordinates in a PSAP database to identify the correct PSAP (115) for those specific coordinates, meaning that the location of the user device (115), rather than a tower handling a wireless 9-1-1 call, is used to determine which PSAP (115) to contact.

In a further example, the call center (113) provide additional notifications to contacts other than a PSAP (115). This may be done, for example, where first responders (119) not accessible through the 9-1-1 system may be more readily available to help. By way of example and not limitation, many large college campuses have on-campus police and security personnel who may be more familiar with campus than municipal police, and who may be able to respond more quickly. If a user device (105) is detected as being within the coverage area of the campus police, the campus police dispatcher may also be contacted by the call center (113) in the same fashion as a PSAP (115), and may be provided the same information using the case manager server (111). This may allow security personnel to more quickly arrive at the proper location. This functionality may be also provided for corporate campuses, casinos, hotels, parks, and any other venue or geofenced location covered by security or law enforcement personnel.

In an example, determining whether to contact such additional responders may be based on the detected location of the user device (105), which is then compared against a database of such organizations or entities associated with a geographically or locationally-defined region. If the detected location of the user device (105) is within one or more such regions, the call center (113) is provided with the contact information for the dispatcher for the associated organization(s), and the call center (113) may additionally or alternatively contact that/those organization(s) to provide case information in the same manner as a PSAP (115). Preferably, both the PSAP (115) and the non-PSAP organizations are contacted, with the call center (113) operator helping to coordinate the response between the various organizations to reduce confusion and improve overall response time.

Because the trip (140) data is stored on the alarm server (109), over time a system may develop a rich body of geographically-defined data indicating "hot spots" where users frequently use the systems and methods. These "hot spots" can be used to determine geographical locations where a comparatively large number of users use the application, suggesting that this area generally feels or appears unsafe. This information can then be used to identify geographic areas suitable for targeted improvements, such as increased lighting or removing obstructions, pruning vegetation, and removing low-visibility areas where an attacker can hide. This information may be further used in police dispatching, allowing law enforcement personal to identify potentially high-risk areas and times and increase patrol presence in those areas at those times. The data can also be compared over time to determine whether remediation steps have been successful in reducing anxiety about the safety of a given area. Similarly, the data can also be used to determine whether a comparatively largely number of users trigger non-false alarms. This data can be used to distinguish between geographic areas where people merely feel unsafe and areas where people actually are unsafe. In an example, the data can be used to develop quantitative scores for neighborhoods, communities, or even specific blocks or homes, indicating the relative safety of the region in question. These scores may in turn be used by real estate brokers and agents, or private homeowners and land owners, to market and sell property.

In the depicted example, the alarm server (109) and the case manager server (111) are distinct. This facilitates a plurality of distinct alarm applications, allowing different technology vendors to use the case manager server (111) and call center (113) systems described herein in conjunction with such vendors' own application interfaces and technologies. That is, the application (107) described herein is designed for use with the described particular alarm server (109), which in turn uses an application programming interface ("API") or software development kit ("SDK") to interoperate with the case manager server (111). However, a third party could independently implement its own application/server and use the same API and SDK to contact emergency personnel using the case manager server (111) and call center (113) systems and methods described herein.

It should be noted that, with the emergence of wearable technology, entering a PIN on small devices, such as smart watches, using a large grid such as that depicted in FIG. 4, is impractical, particularly for an anxious user. An interface offering fewer options would be easier to use without sacrificing significant security. By way of example and not limitation, the PIN unlock screen for a smart watch may display only 4 possible numbers for the user to enter the PIN, one of the four displayed numbers being the first number in the PIN. Once the user selects a number, the display then changes to display a different set of numbers, one of which is the second number of the PIN. Once the user selects a third number, the display then changes to display a fourth set of numbers, one of which is the fourth number of the PIN. Once the user selects a number, the software then determines whether the correct numbers were entered in the correct order. The numbers displayed, and the order, can be randomized to increase security from eavesdroppers. Also, the user may not be provided any indication of which number was incorrect. That is, even if the first number is wrong, the interface may still prompt the user for the other three numbers, making an attempt to brute force crack the PIN more difficult.

In an alternative example, the PIN interface displays all of the numbers comprising the user's PIN and does not refresh. Rather, the user must enter the PIN numbers in the correct order. In a further example, where the PIN contains repeated number, a "false" number may be displayed as a placeholder. For example, where the user's PIN is 1122, the numbers 1 and 2 are displayed in the interface, along with two other randomly selected numbers to fill out the third and fourth number positions.

It is specifically contemplated that the systems and methods described herein may be implemented through direct communication with a responder or dispatcher. For example, when an alarm triggers, the alarm server may automatically determine the first response dispatcher closest to the location of the alarm, based on the geolocation coordinates received from the mobile device, and directly route the emergency to that first response dispatcher (e.g., via a computer at the dispatch officer) by providing geolocation coordinates and information about the emergency to the dispatcher. The dispatcher can then route the appropriate first response personnel to the location of the alarm based on the geolocation coordinates received from the mobile device. This effectively eliminates the need for a PSAP dispatcher in such an example, reducing the overhead and time delays inherent in such systems. The appropriate dispatcher may be determined by consulting a database of dispatcher information, including the identity and location of various dispatchers. This database may later be updated to reflect whether, when a given dispatcher was selected for a given emergency, that dispatcher was able to timely handle the emergency. Over time, such a database would accumulate data concerning the quality and timeliness of emergency response services for various emergencies in various locations. This data could then be used to later identify the right responder, by selecting the responder with the highest rating or effectiveness for the type of emergency in the area indicated by the geolocation coordinates. This data could also be used by public officials and administrators to identify departments or organizations for additional training, performance improvement initiatives, or financial and/or funding initiatives or incentives.

Similarly, in a still further example, the alarm may route the emergency information directly to a nearby first responder. This generally requires that a computer or computing system for the first responder contain appropriate software for receiving and handling such information received from the alarm server and/or mobile device. When an alarm triggers, the alarm server may automatically determine the appropriate first responder closest to the location of the alarm, based on the geolocation coordinates received from the mobile device and based on geolocations about the present location of first responders (e.g., where patrol cars are located), and directly route the emergency to that first responder (e.g., via a computer or vehicular telematics system in a patrol car) by providing geolocation coordinates and information about the emergency directly to the specific first responder. This effectively eliminates the need for both a PSAP dispatcher and first response dispatcher, further reducing overhead and time delays. The appropriate first responder may be determined by consulting a database of first responder information, including the identity and current or most recently known location of various first responders. This database may later be updated to reflect whether, when a given first responder was selected for a given emergency, that first responder was able to timely handle the emergency. Over time, such a database would accumulate data concerning the quality and timeliness of individual emergency responders for various emergencies in various locations. This data could then be used to later identify the best first responder by selecting the responder with the highest rating or effectiveness for the type of emergency, and for the area indicated by the geolocation coordinates received from the mobile device. This data could also be used by public officials and administrators to identify individuals for additional training, performance improvement initiatives, or financial or incentives.

In a still further example, the systems may be used with different user interfaces that begin the alarm process. For example, in one example, the mobile device may not use a specific user interface application, but rather contain programming for detecting vehicular collisions or assaults, such as by using the mobile device's internal sensors. Such techniques could be used to trigger an alarm by presenting the user password interface to indicate a false alarm. If the password is not entered, the systems and methods would proceed as described herein to report an emergency. This covers the situation where an emergency occurs before the user has the opportunity to launch and use an application, such as vehicle accident where the user should not have one hand holding down a button, or a sudden, unexpected assault in an area where the application would not normally be used, such as in one's home or work place.

While the disclosure has been disclosed in connection with certain preferred examples, this should not be taken as a limitation to all of the provided details. Modifications and variations of the described examples may be made without departing from the spirit and scope of the invention, and other examples should be understood to be encompassed in the present disclosure as would be understood by those of ordinary skill in the art.

The invention claimed is:

1. A non-transitory machine-readable storage medium of a mobile user device having stored thereon machine-readable computer program instructions for an emergency alarm application, said program instructions causing the machine to perform the steps of:

displaying on a display of said mobile user device a user interface comprising a touch-operable control;

in response to a user touching said touch-operable control, sending to an alarm server over a telecommunications network a data structure including:

an indication of a previously stored user profile data record for said user, said previously stored user profile data record including a phone number for said mobile user device;

an indication that said emergency alarm application is armed; and a geographic location of said mobile user device;

while said user continues to touch said touch-operable control, transmitting to said alarm server at regular intervals an updated geographic location of said mobile user device;

only upon said user discontinuing to touch said touch-operable control, displaying on said display an interface for entering a password;

in response to said password being entered correctly within a predetermined amount of time, transmitting to said alarm server an updated geographic location of said mobile user device and an indication that said emergency alarm application is disarmed and there is no emergency condition for said user; and in response to said password not being entered correctly within a predetermined amount of time:

transmitting to said alarm server an updated geographic location of said mobile user device and an indication of an emergency condition for said user;

receiving a text message requesting confirmation of an emergency;

receiving a voice call requesting confirmation of an emergency; and receiving an indication that a first responder has been dispatched to a location, said location being determined based on said updated geographic location of said mobile user device.

2. The medium of claim 1, wherein said mobile user device is a vehicular telematics system.

3. The medium of claim 1, wherein said mobile user device is a smart phone or tablet computer.

4. The medium of claim 1, wherein said mobile user device is a wearable computer.

5. The medium of claim 4, wherein said mobile user device is a smart watch.

6. The medium of claim 4, wherein:

said password is a four-digit password;

said displaying to said user an interface control for entering a password of said user comprises:

displaying on a display of said wearable computer a first plurality of digits, one digit in said first plurality of digits being the first digit of said four-digit password;

in response to said user tapping one digit in said displayed first plurality of digits, displaying on said display a second plurality of digits, one digit in said second plurality of digits being the second digit of said four-digit password;

in response to said user tapping one digit in said displayed second plurality of digits, displaying on said display a third plurality of digits, one digit in said third plurality of digits being the third digit of said four-digit password;

in response to said user tapping one digit in said displayed third plurality of digits, displaying on said display a fourth plurality of digits, one digit in said fourth plurality of digits being the fourth digit of said four-digit password; and in response to said user tapping one digit in said displayed fourth plurality of digits, displaying on said display an indication of whether said password is entered correctly; and said password is not entered correctly if any of said one digits tapped by said user does not match the corresponding digit in said four-digit password.

7. The method of claim 4, wherein:

said password is a multi-digit password;

said displaying to said user an interface control for entering a password of said user comprises:

displaying on a display of said wearable computer a number of different digits equal to the number of digits in said multi-digit password, said displayed number of different digits including each of the unique digits in said multi-digit password; and in response to said user entering all digits in said multi-digit password in the correct order using said displayed digits, displaying on said display an indication that said password is entered correctly; and said password is not entered correctly if any of said one digits entered by said user is not entered in the order said digit appears in said multi-digit password.

* * * * *